US009489401B1

(12) United States Patent
Garcia et al.

(10) Patent No.: US 9,489,401 B1
(45) Date of Patent: Nov. 8, 2016

(54) METHODS AND SYSTEMS FOR OBJECT RECOGNITION

(71) Applicant: My EyeSpy Pty Ltd, Victoria (AU)

(72) Inventors: Juan Garcia, Victoria (AU); Reza Bakhshandeh, Shiraz (IR)

(73) Assignee: My EyeSpy PTY Ltd., Victoria (AU)

( * ) Notice: Subject to any disclaimer, the term of this patent is extended or adjusted under 35 U.S.C. 154(b) by 0 days.

(21) Appl. No.: 14/741,186

(22) Filed: Jun. 16, 2015

(51) Int. Cl.
G06F 7/00 (2006.01)
G06F 17/00 (2006.01)
G06F 17/30 (2006.01)
G06K 9/62 (2006.01)

(52) U.S. Cl.
CPC ... *G06F 17/30256* (2013.01); *G06F 17/30247* (2013.01); *G06F 17/30253* (2013.01); *G06F 17/30268* (2013.01); *G06F 17/30867* (2013.01); *G06K 9/6201* (2013.01)

(58) Field of Classification Search
CPC ............. G06F 17/30289; G06F 17/30082; G06F 17/30371; G06F 17/30221; G06F 17/30011
USPC ............................................ 707/694
See application file for complete search history.

(56) References Cited

U.S. PATENT DOCUMENTS

| 6,711,293 | B1 | 3/2004 | Lowe | |
|---|---|---|---|---|
| 8,165,401 | B2 | 4/2012 | Funayama et al. | |
| 8,285,052 | B1* | 10/2012 | Bhattacharyya | G06F 17/30247 382/190 |
| 2006/0251292 | A1* | 11/2006 | Gokturk | G06F 17/30253 382/103 |
| 2008/0159622 | A1* | 7/2008 | Agnihotri | G06K 9/6232 382/157 |
| 2010/0046842 | A1* | 2/2010 | Conwell | G06F 17/30265 382/218 |
| 2010/0331043 | A1* | 12/2010 | Chapman | G01C 21/20 455/556.1 |
| 2011/0244919 | A1* | 10/2011 | Aller | G06K 9/00973 455/556.1 |
| 2013/0204886 | A1* | 8/2013 | Faith | G06Q 30/0631 707/756 |
| 2013/0215116 | A1* | 8/2013 | Siddique | G06Q 30/0643 345/420 |
| 2013/0290234 | A1* | 10/2013 | Harris | G06N 5/022 706/46 |

(Continued)

OTHER PUBLICATIONS

Lowe, DG, "Distinctive Image Features from Scale-Invariant Key Points", *International Journal of Computer Vision*, vol. 60, No. 2, pp. 91-110, 2004.

(Continued)

*Primary Examiner* — Hosain Alam
*Assistant Examiner* — Nicholas Allen
(74) *Attorney, Agent, or Firm* — Frommer Lawrence & Haug LLP; Jon E. Gordon

(57) ABSTRACT

An object identification system comprises at least one database of reference images. Each reference image comprises an identifiable reference object and is associated in the database with a corresponding text description of the reference object. The system also comprises image query resolution data structures, each containing a collection of records having an image descriptor of one of the reference images, and searchable using a corresponding search algorithm. Upon receiving a query comprising an input image including a query object, the system generates a query image descriptor of the input image corresponding with one or more search algorithms, and searches the corresponding image query resolution data structure to identify a closest match record. A best available match record is identified from the closest match records identified in the image query resolution data structures, and a text description of the query object is retrieved corresponding with the associated reference image.

21 Claims, 7 Drawing Sheets

(56) References Cited

U.S. PATENT DOCUMENTS

| | | | | |
|---|---|---|---|---|
| 2014/0019431 A1* | 1/2014 | Suleyman | ......... | G06F 17/30277 707/706 |
| 2014/0080428 A1* | 3/2014 | Rhoads | ............. | G06F 17/30256 455/88 |
| 2014/0304600 A1* | 10/2014 | Chu | ...................... | G06F 3/0481 715/716 |
| 2014/0368890 A1* | 12/2014 | Amtrup | .............. | H04N 1/00251 358/473 |
| 2015/0023602 A1* | 1/2015 | Wnuk | ................ | G06K 9/00671 382/190 |
| 2015/0052121 A1* | 2/2015 | Sharifi | ............... | G06Q 30/0631 707/723 |
| 2015/0127490 A1* | 5/2015 | Puertas | .............. | G06Q 30/0625 705/26.62 |

OTHER PUBLICATIONS

Dong, W, et al, 'Efficient k Nearest Neighbor Graph Construction for Generic Similarity Measures', *WWW 2011,* Mar. 28 to Apr. 1, 2011, Hyderabad, India.

Bay, H et al, 'SURF Speeded Up Robust Features', *Computer Vision and Image Understanding (CVIU)*, vol. 110, No. 3, pp. 346 to 359, 2008.

'TinEye' reverse image search service, http://tineye.com/.

'CamFind' application, http://camfindapp.com/.

CloudSight API, http://cloudsightapi.com/.

Google image search, https://images.google.com/.

Google 'Goggles' app, https://play.google.com/store/apps/details?id=com.google.android.apps.unveil.

* cited by examiner

METHODS AND SYSTEMS FOR OBJECT RECOGNITION

FIELD OF THE INVENTION

The present invention relates to the fields of computer-based searching, vision and object identification, and more particularly to computer-implemented methods and systems for identifying objects appearing in images.

BACKGROUND TO THE INVENTION

Search is a key enabling technology for large-scale information systems, including the internet and the World Wide Web. Without search engines, such as Google search and Microsoft's Bing search engine, finding desired information and other content on the web would be almost impossible.

While text-based search engines have reached a high level of maturity, other forms of searching remain less well-developed. In particular, image-based searching is currently relatively limited and unsophisticated. Google image search (Google, Inc; CA, USA) attempts to identify images on the web based upon text queries provided by a user. For example, entering the words 'white rabbit' into Google image search returns many images of white rabbits that Google's automated crawlers have identified on the web. However, the association between text and image is inferred from text and metadata within the web page(s) in which the image has been found. Since this contextual information may not always accord with the primary feature within an accompanying image, an image search for 'white rabbit' may return images of objects other than white rabbits, images in which a white rabbit is not the main feature, or images of products sold under a 'white rabbit' brand name. Furthermore, there may be images of white rabbits on the web that cannot be identified as such by the surrounding text and/or associated metadata.

A 'reverse image search', or 'search-by-image' function, allows a user to supply their own image, such as a photograph, which is then used to identify similar images held within the search engine's indexed database. Google provides such a feature as part of its image search interface, as well as in an app known as Google Goggles. Another well-known reverse image search engine is TinEye (Idee Inc; Toronto).

A search-by-image engine generally aims to identify the 'most similar' image within its database, according to some (typically proprietary) similarity measure. Thus, for example, if the input search image is a photograph of the Eiffel Tower taken from the opposite end of the Champ de Mars, the closest match will be a similar image, captured from around the same location, at a similar time of day and year, and under similar weather conditions. The associated descriptive text, drawn from the context of the web page in which the image was found, may well be 'Eiffel Tower'. However, it might alternatively be 'Paris in the spring', '$19^{th}$ century civil engineering', or simply 'France'.

The difficulty with this type of search-by-image feature is therefore that it does not necessarily provide the result desired by the user which, in many cases, is an accurate description of an object that appears within an image. This poses two problems that are not addressed by prior art search-by-image engines such as Google and TinEye.

The first problem arises in the need to process images to extract key identifying features of a specific object contained within the image. While the World Wide Web provides a rich corpus of images, many of these are not conducive to this type of analysis. They may be, for example, abstract images, artworks, landscapes, or other images that contain numerous different objects and features, none of which is particularly prominent or uniquely associated with a suitable description of the image.

The second problem is that of providing appropriate text that accurately describes an object appearing in an input image.

It is an object of the present invention to address these problems, and thus to provide an image search engine configured to provide improved object recognition and description, at least when compared with prior art search-by-image engines such as Google reverse image search and TinEye.

SUMMARY OF THE INVENTION

In one aspect, the invention provides an object identification method comprising:
  providing one or more databases which contain:
    a corpus of reference images, each reference image comprising an identifiable reference object and being associated in the database with a corresponding text description of the reference object; and
    a plurality of image query resolution data structures, each comprising a collection of records wherein each record includes an image descriptor of one of the reference images, and wherein each data structure is searchable using a corresponding one of a set of predetermined search algorithms to identify a closest match record within the data structure based upon the image descriptors,
  receiving a query comprising an input image which includes a query object;
  for each of one or more applicable search algorithms selected from the set of predetermined search algorithms, generating a query image descriptor of the input image and searching the corresponding image query resolution data structure to identify a closest match record corresponding with the query image descriptor;
  selecting a best available match record from the closest match records identified in the image query resolution data structures;
  retrieving the text description associated with the reference image corresponding with the best available match record; and
  providing, as an output object identification, the retrieved text description.

Advantageously, embodiments of the invention are able to bring together a number of different algorithms for object recognition in a manner that exploits the best features of each, and flexibly enables new and/or additional algorithms to be incorporated, updated, or improved as new developments are made in the fields of computer vision, image processing and object recognition. Embodiments of the invention are able to take advantage of specific, efficient, and highly reliable techniques, such as barcode and QR code detection and decoding, but also to fall back upon a succession of alternative analysis, detection and searching methods, such as text extraction, fast feature extraction, more accurate (but more resource intensive) feature extraction, along with general techniques such as image searching, crowd sourcing, and the use of third-party services, in order to provide a good trade-off between speed and accuracy, as well as enabling the system to 'learn' from its experience of search images.

In some embodiments, the set of predetermined search algorithms includes one or more algorithms selected from the group comprising: a barcode detection algorithm, a QR code detection algorithm; a text detection algorithm; a movie poster detection algorithm; a product detection algorithm; and a general image detection algorithm.

Accordingly, in some embodiments, generating a query image descriptor comprises one or more of:
  extracting barcode features from the input image;
  extracting QR code features from the input image;
  extracting text features from the input image;
  extracting Speeded Up Robust Features (SURF) feature vectors from the input image; and
  extracting Scale Invariant Features Transform (SIFT) feature vectors from the input image.

In particular embodiments, for example, the movie poster detection algorithm may employ a query image descriptor comprising SURF feature vectors. The product detection algorithm and/or the general image detection algorithm may employ a query image descriptor comprising SIFT feature vectors.

The corpus of reference images may be constructed, at least in part, using a plurality of content-specific crawler processes, each of which is configured to retrieve content-specific images and associated descriptive text.

Advantageously, the use of content-specific crawlers enables embodiments of the invention to build a corpus of reference images, and associated text descriptions, which are drawn from controlled contexts in which images are highly likely to comprise a primary identifiable object or visual feature, and in which descriptive text likely to correspond with the primary object or visual feature can be automatically identified from the context. For example, the content-specific crawler processes may be configured to crawl web sites selected from:
  online movie databases;
  online stores;
  online encyclopedias; and
  specific-interest-related web sites.

In a further technique for building the corpus of reference images, embodiments of the invention may employ results from image search queries.

In embodiments of the invention, the image query resolution data structures comprise one or more of:
  a barcode index data structure;
  a QR code index data structure;
  a text index data structure;
  a k-dimensional tree structure of feature vectors; and
  a n-Nearest Neighbor graph structure of feature vectors.

Embodiments of the invention may further comprise a history database containing previously received input images and associated text descriptions for an improved match to the input image, relative to the best available match.

Embodiments of the invention may further provide one or more 'fall back' processes, in the event that a sufficiently good result cannot be identified within the main corpus of reference images. For example, a quality measure of the best available match may be compared against a predetermined threshold requirement and, in the event that the quality measure fails to meet the threshold requirement, obtaining a third-party text description of the image by performing one or more further steps selected from the group comprising:
  performing a reverse image search of the input image using a remote image search engine to obtain a text description corresponding with the image;
  submitting the input image to a remote online crowd-sourcing service along with a request for a text description of the query object to obtain a text description corresponding with the image; and
  submitting the input image to a remote third-party automated image identification service to obtain a text description corresponding with the image.

The input image may be stored in association with the third-party text description in a history database, which may then be searched for an improved match to a subsequently-received input image, relative to the best available match.

Embodiments of the invention may provide for improvements in object recognition based upon user input. For example, the method may further comprise:
  receiving user feedback in relation to accuracy of the retrieved text description;
  storing the user feedback for subsequent review by an operator;
  subsequently receiving an instruction from the operator to update the corpus of reference images based upon the user feedback; and
  updating the corpus of reference images.

In another aspect, the invention provides an object identification server comprising:
  at least one processor;
  at least one non-volatile storage device comprising one or more databases which contain:
    a corpus of reference images, each reference image comprising an identifiable reference object and being associated in the database with a corresponding text description of the reference object; and
    a plurality of image query resolution data structures, each comprising a collection of records wherein each record includes an image descriptor of one of the reference images, and wherein each data structure is searchable using a corresponding one of a set of predetermined search algorithms to identify a closest match record within the data structure based upon the image descriptors,
  at least one computer-readable memory device operatively associated with the processor; and
  a network communications interface operatively associated with the processor,
  wherein the memory device contains computer-executable instruction code which, when executed via the processor, causes the processor to effect a method comprising steps of:
    receiving a query comprising an input image which includes a query object;
    for each of one or more applicable search algorithms selected from the set of predetermined search algorithms, generating a query image descriptor of the input image and searching the corresponding image query resolution data structure to identify a closest match record corresponding with the query image descriptor;
    selecting a best available match record from the closest match records identified in the image query resolution data structures;
    retrieving the text description associated with the reference image corresponding with the best available match record; and
    providing, as an output object identification, the retrieved text description.

Further features and benefits of the invention will be apparent from the following description of embodiments, which is provided by way of example only and should not be taken to limit the scope of the invention as it is defined in any of the preceding statements, or in the claims appended hereto.

BRIEF DESCRIPTION OF THE DRAWINGS

Embodiments of the invention will now be described with reference to the accompanying drawings, wherein like reference numerals represent like features, and in which.

DETAILED DESCRIPTION OF EMBODIMENTS

Figure 1:
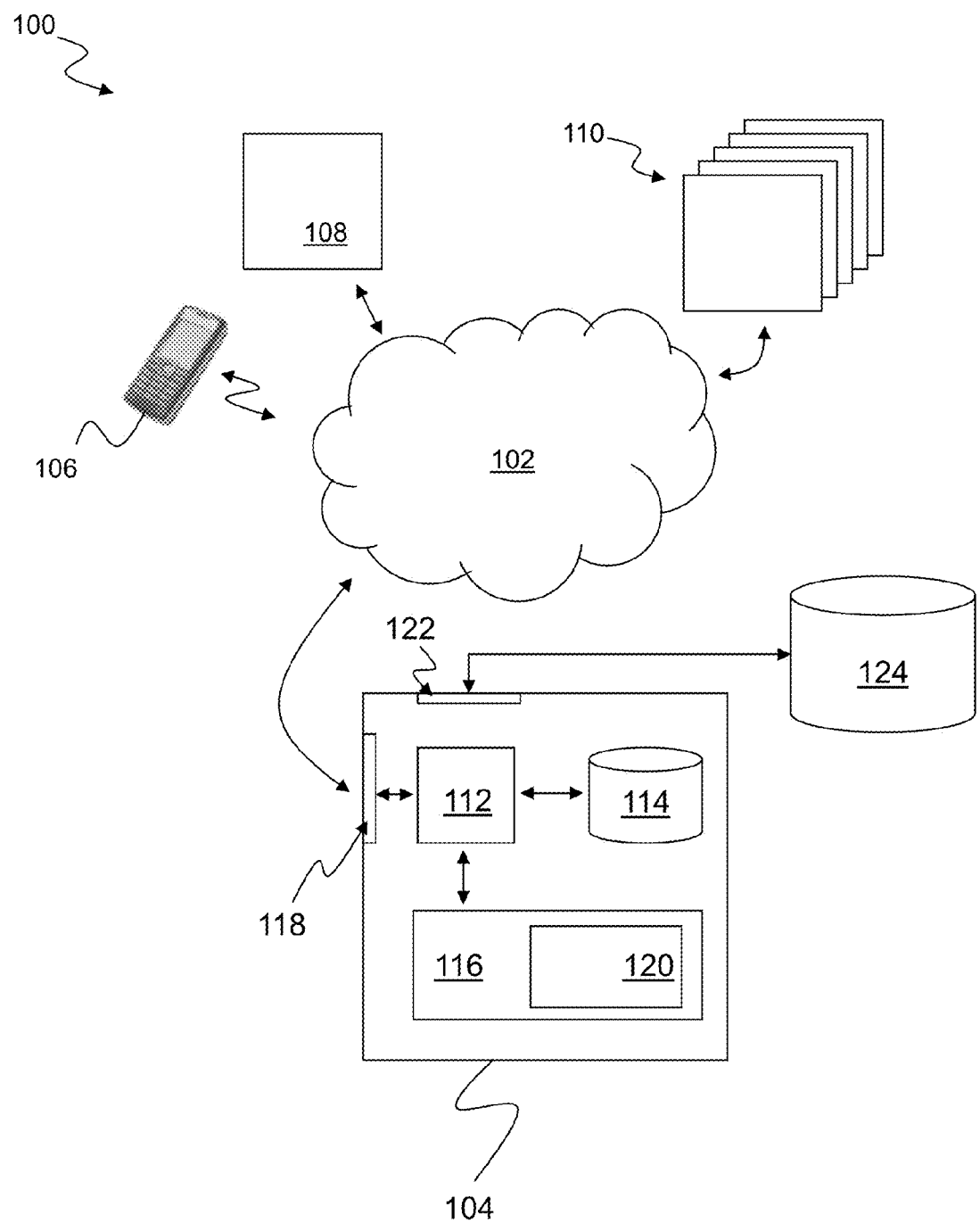
FIG. 1 is a schematic diagram illustrating a system for object recognition embodying the invention.

FIG. 1 is a block diagram illustrating an online system 100 embodying the invention. The system 100 employs a wide area communications network 102, typically being the Internet, for messaging between different components of the system, each of which generally comprises one or more computing devices.

The system 100 includes an object recognition server 104, which is accessible via the Internet 102 from a variety of suitable client devices, including smart phones 106, notebook PCs, tablet PCs and other portable devices, desk top computers 108, and other network-connected devices.

Also accessible to the object recognition server 104 via the Internet 102 are numerous other server systems 110. Generally, these include servers providing web-based services, such as search engines, e-commerce sites, information sites (including online encyclopedias such as Wikipedia) and specialized information services such as the Internet Movie Database (IMDB), as well as all other publicly accessible Internet-connected servers. Accordingly, the object recognition server 104 is able to access the Internet-based servers 110 in order to retrieve, analyze and index content, including image content which is managed according to processes described in this specification.

The object recognition server 104 may generally comprise one or more computers, and in particular may be implemented using a cluster of computing processors, which may be located at a single data center, or distributed over a number of geographic locations. For simplicity in describing the concepts and operation of embodiments of the present invention, reference will be made to a single exemplary server processor 112, of the object recognition server 104, which is representative of a collection of such processors that may be employed in practical common scalable embodiments of the invention.

The (or each) processor 112 is interfaced to, or otherwise operably associated with, a non-volatile memory/storage device 114. The non-volatile storage 114 may be a hard disk drive, and/or may include a solid-state non-volatile memory, such as Read Only Memory (ROM), flash memory, or the like. The processor 112 is also interfaced to volatile storage 116, such as Random Access Memory (RAM) which contains program instructions and transient data relating to the operation of the object recognition server 104. In a conventional configuration, the storage device 114 may contain operating system programs and data, as well as other executable application software necessary to the intended functions of the object recognition server 104. The storage device 114 may also contain program instructions which, when executed by the processor 112, enable the object recognition server 104 to perform operations relating to the implementation of an object recognition system embodying the invention. In operation, instructions and data held on the storage device 114 are transferred to volatile memory 116 for execution on demand.

The processor 112 is also operably associated with a network interface 118 in a conventional manner. The network interface 118 facilitates access to one or more data communications networks, such as the Internet 102, employed for communication between the server 104, client devices 106, 108, and other Internet-connected servers 110.

In use, the volatile storage 116 includes a corresponding body 120 of program instructions configured to perform processing and operations embodying features of the present invention, comprising various steps in the processes described below with reference to the flowcharts, data structures, flow diagrams, and software architectures illustrated in FIGS. 2 to 8. Furthermore, in the presently described embodiment, the program instructions 120 include instructions implementing communications with one or more client applications, such as applications that may execute on client devices 106, 108. These communications operations enable images to be transferred from the client devices 106, 108 to the object recognition server 104 for analysis and object recognition.

The program instructions 120 may further include instructions embodying a web server application. Data stored in the non-volatile 114 and volatile 116 storage may then include web-based code for presentation and/or execution on client devices (e.g. HTML or JavaScript code) facilitating a web-based interface to the object recognition server 104. The web-based interface may, for example, enable upload of images from any device, including smart phones, desktop PCs, notebook PCs, tablet devices, and so forth. Additionally, the program instructions 120 may include instructions implementing an API to enable programmatic access to object recognition services, for example via HTTP POST requests.

The processor 112 is also operably associated with a further interface 122, such as a storage area network (SAN) interface providing access to large-scale storage facilities 124. The storage facilities 124 may be collocated with the object recognition server 104, or may form part of a remote and/or distributed database accessible via the Internet 102, or other communications networks. The storage interface 122 may be a separate physical interface of the object recognition server 104, or may be a virtual interface implemented via the physical network interface 118. These and other mechanisms for providing and accessing large-scale storage 124 will be apparent to persons skilled in the relevant arts.

Figure 2:
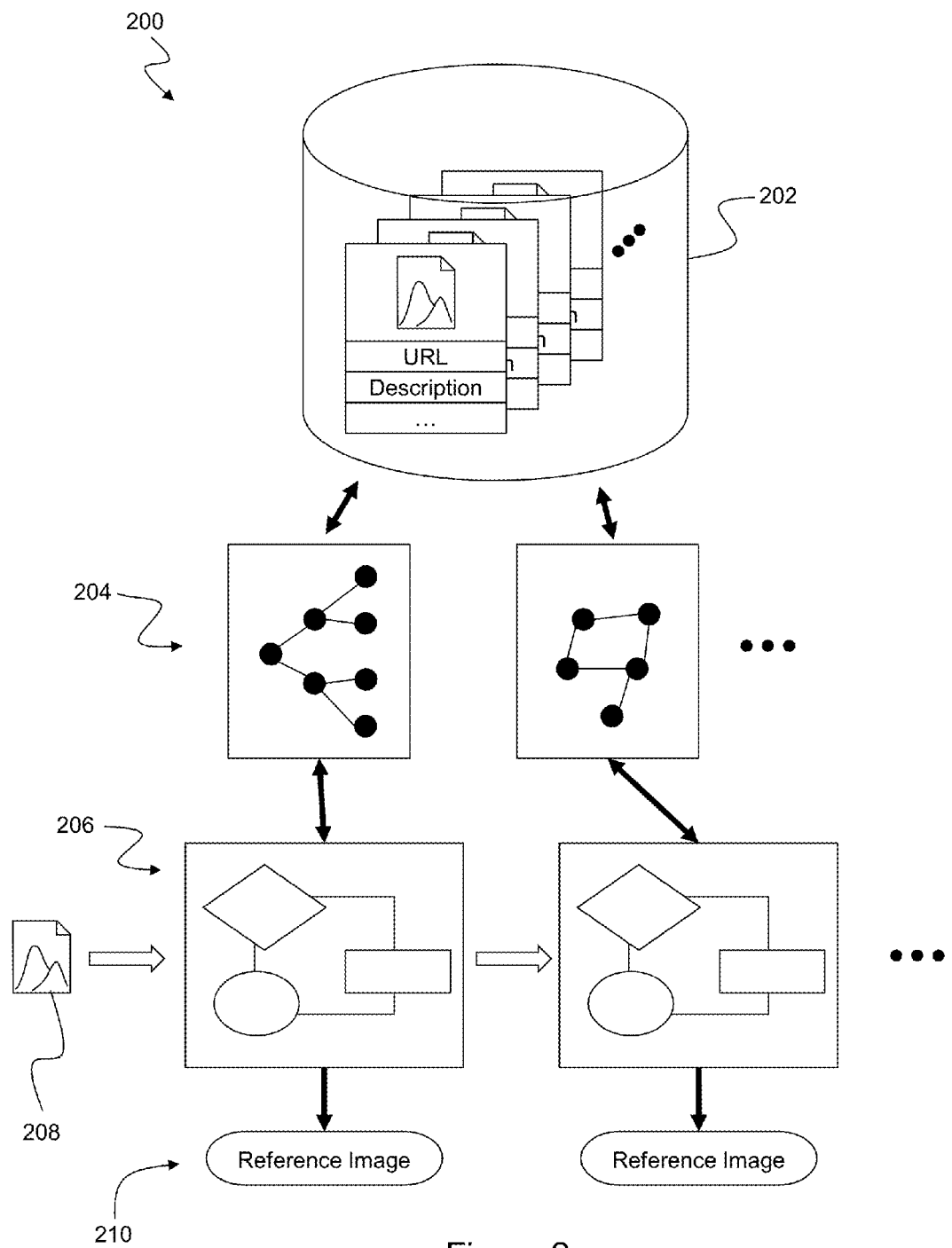
FIG. 2 is a block diagram illustrating a software architecture of a system embodying the invention.

The large-scale storage 124 is used to store, access, update and maintain a number of databases employed by the object recognition server 104. FIG. 2 is a block diagram illustrating a software architecture 200 embodying the invention, in which the contents of various databases, along with the algorithms used to access those databases are represented. One such database 202 contains a corpus (i.e. a large body or collection) of reference images, including images that have been retrieved from various Internet-connected servers 110 by crawler processes executing on the object recognition server 104. In the embodiment described here, the database 202 contains a table including copies of the retrieved images, a corresponding URL from which the image was retrieved, and a text description corresponding with an object depicted in the image. The manner in which these images are obtained, and the text descriptions derived, is described in greater detail below with reference to FIG. 4.

The connected storage 124 also contains one or more further databases comprising a number of query resolution data structures 204. These query resolution data structures are, in effect, indexes to images stored within the corpus database 202. The query resolution data structures may take various forms, including graphs, trees, linked lists, pivot tables, and so forth, depending upon the nature of the indexing data, and algorithms used to access that data. Accordingly, there is a corresponding algorithm 206 associated with each of the query resolution data structures 204. Further details of a number of exemplary algorithms for constructing, maintaining and searching the query resolution data structures for a number of different types of identifiable image content are described in greater detail below with reference to FIGS. 5 to 8.

In general, an input image, also referred to as a query image, 208 is received by the object recognition server 104 via the Internet 102 from a variety of suitable client devices, including smart phones 106 and other portable devices, desk top computers 108, and other network-connected devices. One or more of the algorithms 206 will be identified as being potentially applicable to analysis of the query image 208, and executed to identify a reference image 210, from the corpus of reference images in the database 202, which is determined to be a closest match by the applied algorithm 206.

Figure 3:
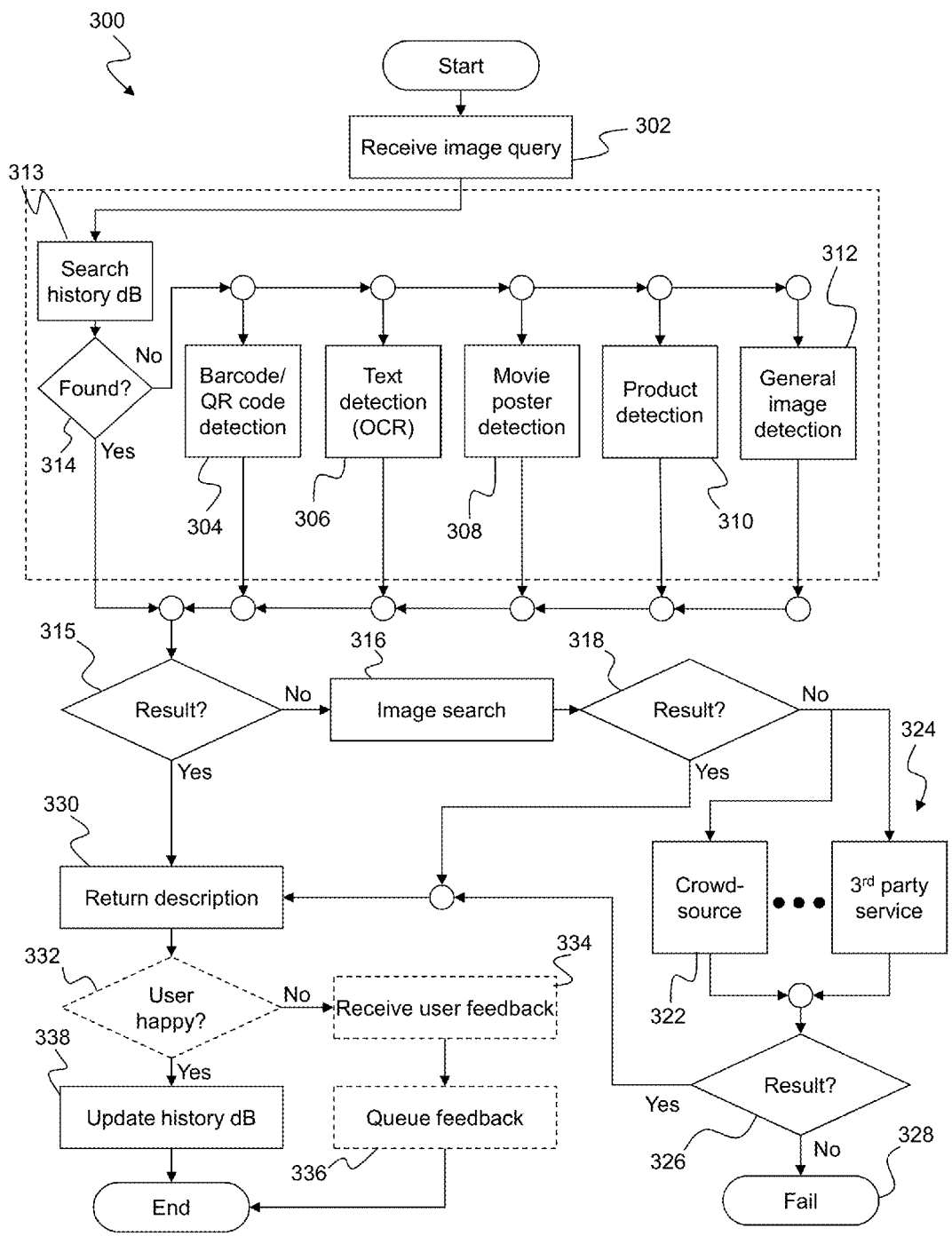
FIG. 3 is a flowchart of a method of object recognition embodying the invention.

FIG. 3 shows a flowchart 300 of a method of object recognition embodying the invention. In the implementation described here, the method 300 is executed at the object recognition server 104, in particular by the execution of suitable program instructions 120 by the processor 112.

At step 302 an image query (i.e. input image 208) is received by the object recognition server 104 via the network interface 118. As has been described generally above, with reference to FIG. 2, the object recognition server 104 is configured to implement a set of predetermined search algorithms 206, each of which corresponds with an index, in the form of a query resolution data structure 204. As illustrated in the flowchart 300, any one or more out of the set of predetermined search algorithms may be executed in relation to the received image query 208, in order to identify an object appearing in the image.

A number of exemplary search algorithms are illustrated in the flowchart 300, namely:
- a barcode/QR code detection and decoding algorithm 304;
- a text/OCR (optical character recognition) detection algorithm 306;
- a movie poster detection algorithm 308;
- a product detection algorithm 310; and
- a general objection recognition algorithm 312.

While this combination of algorithms has been found to be effective in identifying objects within search images, it will be appreciated that this is not intended as an exhaustive list of all algorithms, whether presently available or developed in the future, that may be employed in embodiments of the invention.

In the flowchart 300, the algorithms 304 to 312 are shown as being executed in parallel. According to this implementation, all algorithms are selected, although generally they will complete execution in order of increasing complexity and computational cost. Therefore, if an object is identified, for example, by the barcode/QR code detection algorithm 304, it may be unnecessary to await completion of the subsequent algorithms 306 to 312. In some embodiments, some or all of the available predetermined search algorithms will be executed prior to returning a result, in order to compare results and/or to identify a result having a higher confidence level. In various embodiments, the multiple algorithms may be executed sequentially, or in parallel, for example on multiple processor cores, on multiple processors of a single processing node, or across multiple processing nodes. All of these options are within the scope of the invention.

Additionally, embodiments of the invention may employ a history database, which is a collection of previously-searched images and associated returned descriptions (see step 338, discussed below), not dissimilar from the main corpus of reference images within the database 202. The history database can therefore be used along with a further associated history image search algorithm 313 to identify similar images provided as input in future image searches. The history image search algorithm 313 may be a relatively inexpensive reverse image search algorithm, which is optimized to identify exact, or near-exact, images and/or sub-images, within the history database. Advantageously, therefore, execution of the history image search algorithm 313 will generally complete prior to completion of execution of one or more other object recognition algorithms. Thus, a result may be returned more rapidly, and at lower computational cost, for input images for which matches exist in the history database. As shown in the flowchart 300, the history algorithm 313 is executed prior to the algorithms 304 to 312. Alternatively, in some embodiments the history search algorithm 313 may be executed concurrently with the algorithms 304 to 312. In still further alternative embodiments, the history search algorithm may be employed at a different stage in the overall execution of algorithms 304 to 312. All such configurations are within the scope of the present invention. In the present embodiment, as illustrated in FIG. 3, the result of the image search algorithm 313 is checked 314, and only if no matching image has been found in the history database, control passes to algorithms 304 to 312.

At step 315 a check is made to determine whether or not one or more of the executed algorithms has generated a result with a sufficiently high confidence. If not, then some further steps may be executed in an effort to derive a response to the image query 208. For example, at step 316 the image is submitted to a 'reverse image' search engine which provides an API accessible via the Internet 102. These conventional image search services will attempt to find the closest match for the image within their databases, which have been populated by crawling the entire World Wide Web and indexing all available images. A successful match has an associated description, which is based upon the search engine's analysis of the surrounding context within the web pages on which the image appears. This search-engine-generated description may, or may not, be an accurate description of a primary object appearing in the input image 208. However, if such a result can be found, as determined at step 318, the descriptive text returned by the reverse image search engine may be the best available 'guess' at the content of the input image 208.

If, at decision point 318, no suitable image search results are obtained from step 316, the object recognition server 204 may execute one or more further object recognition methods, which are generally regarded as 'high cost', and therefore as options of last resort. Two such options are illustrated in the flowchart 300, namely a crowd-sourcing object recognition option 322, and a third-party image/object recognition option 324. Crowd sourcing 322 employs a distributed body of human operators to review and annotate images submitted by the object recognition server 104. The task of object identification is made available to human operators registered with the crowd sourcing service, and one such operator will accept the task and return an object description in exchange for payment. Alternatively, an operator of the object recognition service may employ, directly or indirectly, its own team of operators for review and annotation of unrecognized objects. Accordingly, there is a financial cost, as well as a time delay, associated with the crowd-sourcing function 322.

Additionally, and optionally, one or more third-party object recognition services may be employed as parallel functions 324 to the crowd sourcing function 322. Typically, there may be a further financial cost associated with such services. Furthermore, the accuracy and quality of third-party services is unknown. However, the use of such services may be appropriate if all other attempts to identify an object in a query image have been unsuccessful.

At step 326, a check is made to confirm whether one or both of the crowd-sourcing 322 and third-party 324 options have returned a useful result. If not, then all efforts to identify an object in the search image 208 have failed 328. Otherwise, as with the image search results, the input image 208 and the associated description may be added to the history database at step 338 (see below). Accordingly, through use of the history database, and/or incorporation of images and associated descriptions from the history database into the main reference image database 202, a subsequent input image 208 of identical or similar appearance, and including a similar object, can be recognized without repeating access to the crowd-sourcing 322 or third-party 324 recognition options.

At step 330, the description of the object within the input image 208, whether obtained via the algorithms 304 to 312, via reverse image search 316, or via crowd-sourcing 322 or third-party 324 object recognition, is returned to the user who submitted the input image 208. In some embodiments, the user is given an option, either within the application interface used to access the object recognition server 104, or via a web interface, to indicate at 322 whether or not the user is satisfied with the result. For example, the user may simply be prompted to provide an indication (such as by pressing an on-screen button) if the result does not appear to correspond with the object in the input image 208 in the user's opinion.

If the user indicates dissatisfaction, some embodiments of the invention may provide a facility for the user to provide more detailed feedback. In such embodiments, this feedback is received from the user at step 334. The feedback may be, for example, that the description returned by the object recognition server is incorrect in the user's opinion. The user may provide an alternative suggested description, or may be unable or unwilling to do so. In any event, the feedback, along with the input image 208, is added to a queue at step 336, for subsequent review by a human operator. In this way, offline review of feedback in the queue enables human operators to manually review input images, to compare against the descriptive text actually returned by the object recognition server 104, and to review any alternative description and other information provided by the user. This information, along with the operator's own observations and other enquiries, may be used to provide a suitable description associated with the input image 208, which can then be used to update the history database (see step 338, described below), and/or the main reference image database 202. It should further be noted that a failure (see step 328) may also result in the unidentified input image 208 being added to the queue for subsequent offline review by a human operator. In this way, the ability of the object recognition server 104 to correctly identify and describe objects within images is subject to continuous learning and improvement.

In the event that the user provides no feedback, or provides positive feedback (if this option is available) control passes to step 338, in which the input image, and the associated descriptive text, are incorporated into the history database, so that they can be used in future searches (see steps 309, 310 discussed above).

Figure 4:
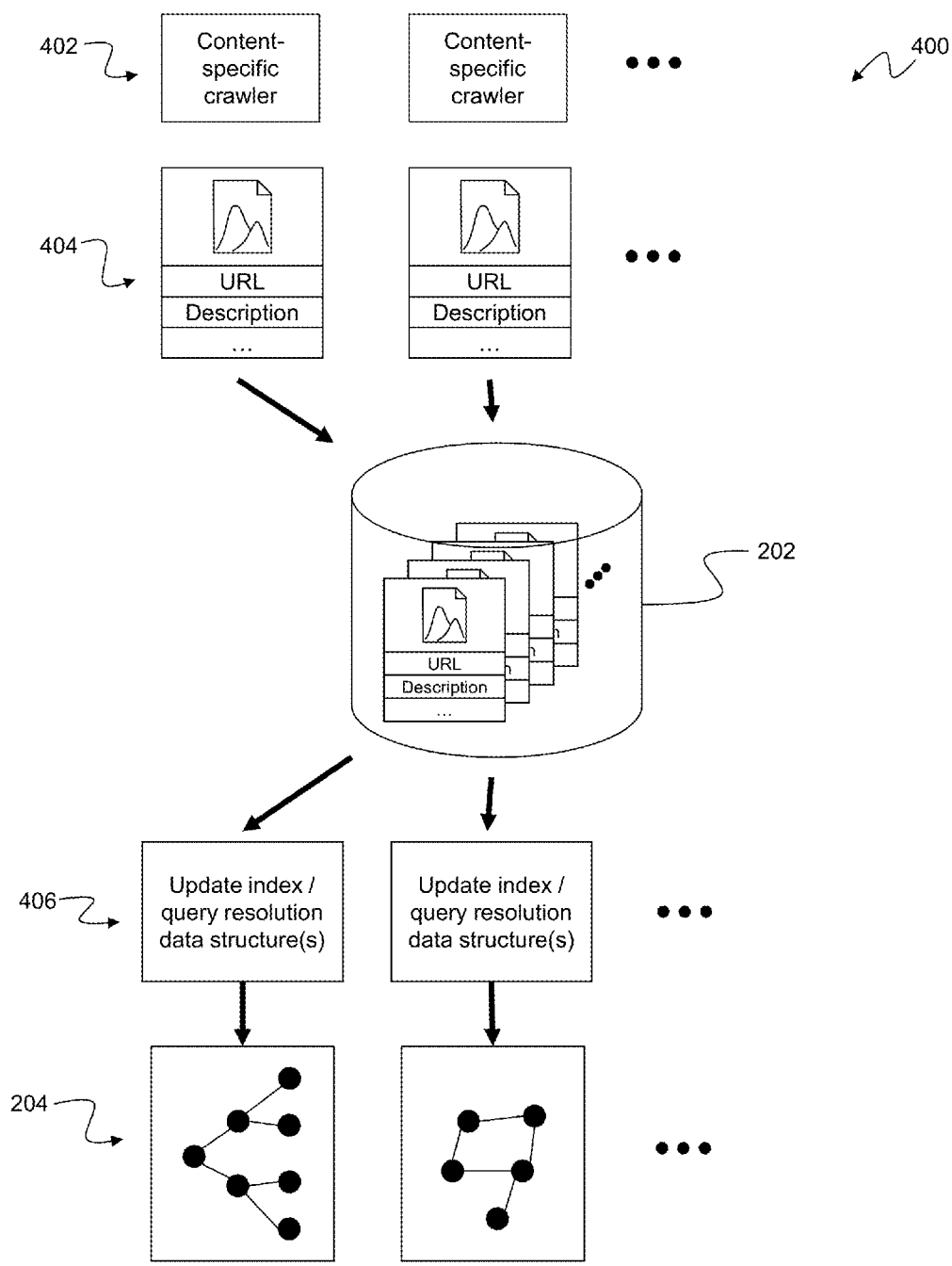
FIG. 4 is a flow diagram illustrating methods of analyzing and indexing images embodying the invention.

Turning now to FIG. 4, there is shown a flow diagram 400 illustrating methods of analyzing and indexing images, according to an embodiment of the invention. These methods employ a number of content-specific crawlers 402. As is well-known in the art of web page indexing and searching, a crawler is a software process that traverses the World Wide Web, or a portion thereof, starting at one or more seed URLs, and then progressively following links to identify, retrieve and/or index a corresponding portion of the internet. General purpose search engines attempt to crawl effectively the entire internet, although their crawler processes will generally seek to optimize the frequency with which different parts of the internet are crawled.

In contrast, embodiments of the present invention employ content-specific crawler processes 402. These processes are configured to traverse and analyze specific subsets of the internet, based on one or more identified domain names or other criteria. In particular, certain types of web sites are known to have particular syntactic and semantic structures, which can significantly assist in identifying appropriate images for inclusion in the database 202 containing the corpus of reference images, and in identifying corresponding text descriptions associated with each such image.

For example, an e-commerce web site will generally have a standardized product page format, from which an image of a product, and an associated product description, can be readily extracted. Such images are less likely to include extraneous objects or features, and thus may provide excellent reference images for the corresponding product/object. Furthermore, additional information, such as an ISBN number for a book may readily be extracted based on page semantics. Such additional object-/product-specific information can be stored in the reference image database 202, along with the images, corresponding URLs, and text descriptions.

More generally, examples of the types of web sites for which content-specific crawlers are, or may be, provided within embodiments of the invention include:
  movie databases;
  online stores;
  online encyclopedias;
  specific-interest-related web sites (e.g. cars, shoes, jewelry, animals, plants, toys, clothing); and
  search engines.

With regard to search engines, queries may be submitted in relation to particular object categories, and the search results used to identify individual pages, or seed pages, for further analysis by the content-specific crawlers 402.

As images are incorporated into the corpus of reference images 202, other offline processes 406 are executed in order to build and maintain the query resolution data structures 204. Different types of content may employ different forms of indexing, and may therefore be associated with different query resolution data structures 204. Furthermore, as has already been discussed above, with reference to FIGS. 2 and 3, different search algorithms are therefore employed to identify matching images/objects using the different forms of indexing provided by each of the query resolution data structures 204. For example, images of commercial products may include barcodes, or QR codes, which can be readily identified and simply indexed according to barcode values and/or QR code contents. Other types of products, including books, may include characteristic textual content that can be extracted and analyzed using OCR algorithms, and indexed using the identified text in a conventional manner. Objects such as movie posters or other promotional items, may include highly distinctive graphical features that are readily distinguished using simplified feature extraction and recognition algorithms such as Speeded Up Robust Features (SURF). For general images, a more complex and complete method of feature extraction and comparison, such as Scale Invariant Features Transform (SIFT) may be employed. This list of algorithms is provided by way of example only, and is not intended to be exhaustive. For example, other algorithms such as those involving image hashing or deep belief networks (DBN) may be employed in addition to, or in place of, one or more of the preceding exemplary algorithms.

A number of exemplary indexing and search algorithms are illustrated in the flow diagrams of FIGS. 5 to 8, and will now be discussed.

Figure 5:
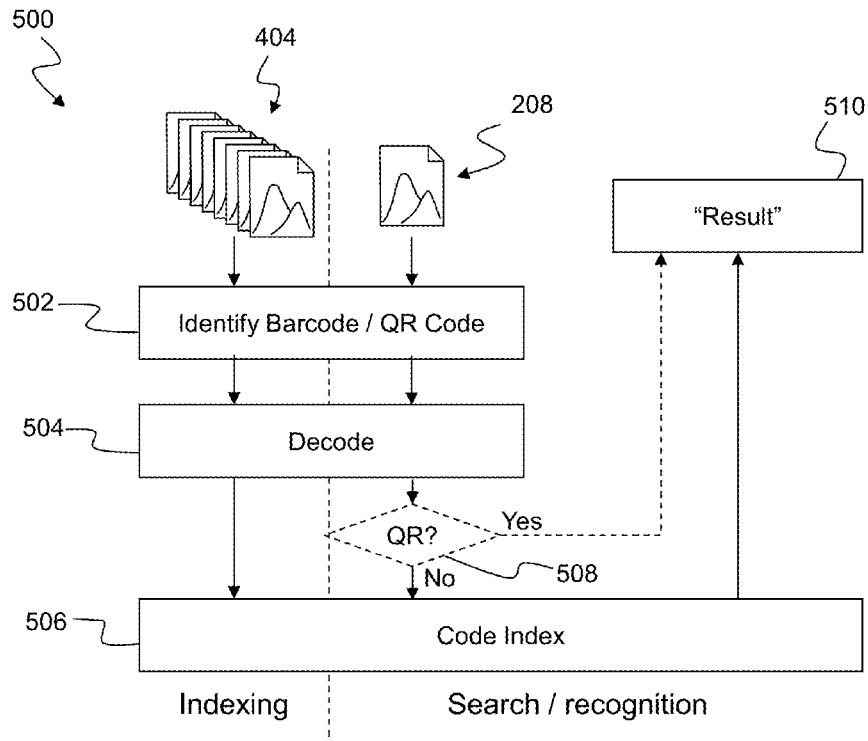
FIG. 5 is a flow diagram illustrating barcode/QR code indexing and search embodying the invention.

FIG. 5 shows a flow diagram 500 illustrating barcode/QR code indexing and search embodying the invention. In general, the various algorithms employed by embodiments of the invention follow a similar pattern, although other image searching and object recognition techniques may be employed in alternative embodiments, and need not necessarily follow this same pattern. Broadly speaking, however, images 404 identified and retrieved by the content-specific crawlers 402 are analyzed to extract 'features' (which are non-image descriptors characterizing objects appearing within the images, and are generally defined differently for different indexing and search algorithms), which are then used to build an index or query resolution data structure that can subsequently be used to identify a 'best match' for a subsequent input image 208. Searching generally proceeds by performing the same form of feature extraction, whereby the resulting extracted features may be compared with the contents of the index or query resolution data structure in order to identify a viable matching object.

Returning to the specific example of barcode/QR code indexing and search in the flow diagram 500, a first step in both indexing and search is to identify the presence of a barcode or QR code within the input image 404, 208, as indicated by the block 502. If a barcode or QR code is identified, this can then be decoded 504. As is well-known, barcodes employ a number of standardized encodings, e.g. UPC-A, UPC-E, EAN-13, and EAN-8. All such barcodes can be decoded into a corresponding sequence of numbers and/or letters, which can then be used for indexing 506. Suitable text descriptions associated with products including barcodes may be obtained from the pages on which the images are found, and/or may be obtained or verified using any one of a number of publicly available barcode databases.

If a barcode is identified in an input image 208, and a matching barcode has been identified in a reference image, then an exact match will exist in the index. QR codes, similarly, are machine-readable with high reliability, and may contain up to 2953 bytes of data. While QR codes can be incorporated into the index 506, often their contents are descriptive and may include a URL. Accordingly, a QR code may itself contain a suitable text description, and/or may provide a URL from which a suitable text description can be directly extracted. This decision regarding the handling of QR codes, i.e. indexing or direct interpretation, is indicated at 508 of the flow diagram 500.

In any event, matching of a barcode with an index entry, and/or interpretation of a QR code, enables a text description result 510 to be returned. As noted above, barcodes and QR codes are designed to be machine readable, and to be relatively robust to variations in size and orientation, and libraries of existing code are available for identifying, reading and decoding all available barcode standards and QR codes. One such library is ZBar, which is an open-source software suite available for download, e.g. from http://zbar.sourceforge.net.

Figure 6:
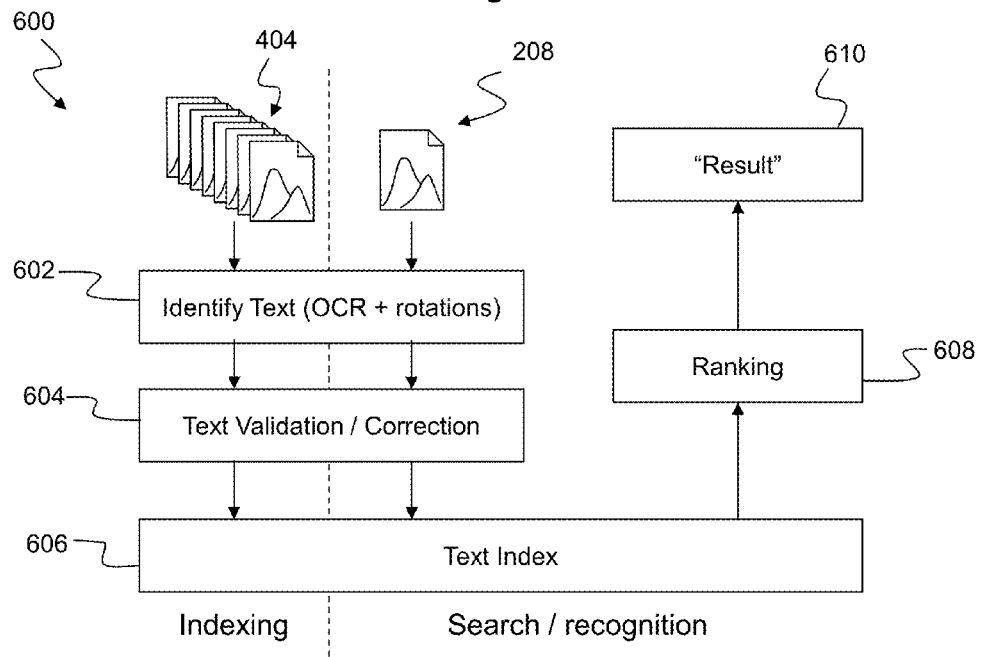
FIG. 6 is a flow diagram illustrating text/OCR indexing and search embodying the invention.

FIG. 6 is a flow diagram 600 illustrating text/OCR indexing and search suitable for deployment in embodiments of the invention. Again, the algorithms employ common feature extractions 602 and post-processing 604 which are applied to reference images 404 as well as to input query images 208. In particular, a process 602 is employed to identify text within images, using optical character recognition (OCR) algorithms. Because OCR algorithms are orientation-specific, and text is often rotated within input images, the process 602, according to embodiments of the invention, applies the OCR algorithms to a number of rotations of the input images. Preferably, OCR is performed at least for the input orientation, as well as rotations of 90, 180 and 270 degrees. Additional rotation orientations may also be employed.

If text is identified and extracted, post-processing 604 is performed. In particular, a number of checks are performed in order to confirm that the extracted text is valid, and to 'normalize' the extracted text features. The text validation algorithm employs a number of rules to assign a rating to extracted text, which is used to assess the reliability and quality of the extracted text. These rules include the following:

it has been observed that reliable OCR text most commonly comprises a single line, and accordingly single-line text extraction is given an increased rating;

uncommon and/or non-English (or other supported language) characters are considered indicative of low-quality OCR, and result in a rating decrease;

ratings may also be reduced for non-alphabetic characters, which are generally less common in useful descriptive text; and one or more dictionaries may be employed (e.g. the Enchant English Dictionary) to validate individual words, with the presence of valid dictionary words increasing the rating.

Dictionaries, and associated spellchecking algorithms, may be used to correct minor errors in OCR, e.g. when an extracted word is very close to a valid dictionary word. Words and phrases extracted by OCR from reference images 404 are incorporated into an index 606. Text extracted from an input query image 208 can be compared with entries within the index 606 as part of a search process. Errors and imperfections in OCR, as well as small variations in images, changes in orientation, and so forth, mean that (in contrast to barcodes and QR codes) an object which is indexed by associated OCR text may not be an exact match with text extracted from a corresponding query image input 208. Accordingly, a number of close matches may be identified, and ranked 608. A ranking may be based upon an appropriate distance measure between text extracted from the input image 208 and similar words and phrases that have previously been indexed 606. A closest-match may then be provided as a result 610. Alternatively, if the ranking of extracted text and/or a closeness of match based on the distance measure fails to meet a predetermined threshold, the match may be rejected and an alternative recognition process employed.

Figure 7:
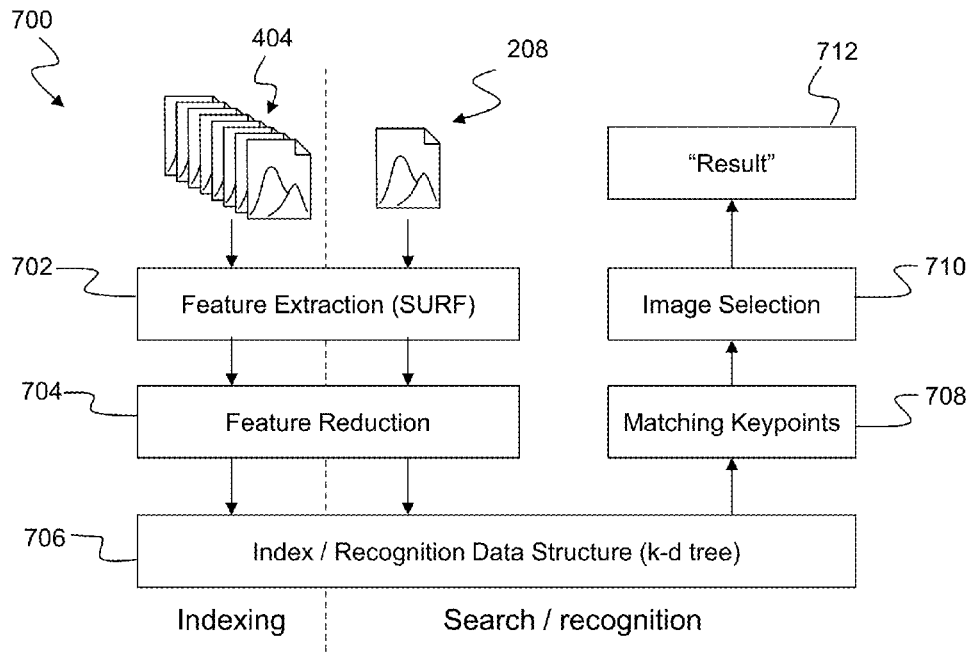
FIG. 7 is a flow diagram illustrating movie poster indexing and search using a SURF algorithm embodying the invention.

FIG. 7 is a flow diagram 700 illustrating a movie poster indexing and search process that may be employed in embodiments of the invention. An exemplary implementation employs the SURF algorithm for feature extraction 702. This algorithm is described in Herbert Bay et al, 'SURF Speeded Up Robust Features', *Computer Vision and Image Understanding (CVIU)*, Volume 110, No. 3, pages 346 to 359, 2008. Code libraries are available to implement this algorithm, including Open Source Computer Vision (OpenCV), available from http://opencv.org. A feature reduction process 704 is employed to decrease memory usage and increase speed, whereby feature points extracted by the SURF algorithm 702 are clustered and thinned within dense parts of the image. Following evaluation of performance of a number of sizes for the SURF feature vectors, a vector size of 128 has been chosen in an embodiment of the invention. At 706, a k-dimensional (k-d) tree is employed as the image query resolution data structure for indexing the SURF feature vectors for movie poster images. The k-d tree is optimized to permit parallel searching over portions of the tree in order to identify feature sets associated with the reference images 404 that are most similar to the feature sets extracted from the input image 208. A set of closest matching key points 708 is returned from the search algorithm, from which one 'best match' is selected 710. The text description associated with the corresponding image in the reference image database 202 is then selected and returned 712 as the result. Alternatively, if a closeness of match based on a key point similarity measure fails to meet a predetermined threshold, the match may be rejected and an alternative recognition process employed.

Figure 8:
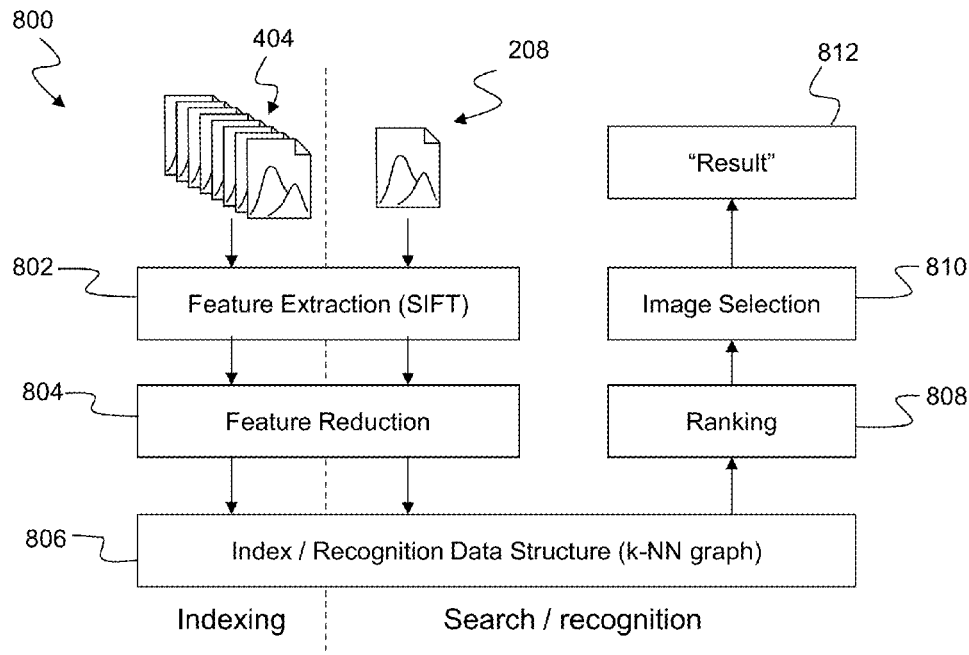
FIG. 8 is a flow diagram illustrating general image indexing and search embodying the invention.

For images that are not identified as containing objects falling within a special category (e.g. barcodes/QR codes, identifiable text, movie posters, and/or any other specific categories for which algorithms are provided within an embodiment of the invention) a general analysis and object recognition algorithm is provided, a flow diagram 800 of which is illustrated in FIG. 8.

For general images, SIFT feature extraction is employed, as described in Lowe, D G, 'Distinctive Image Features from Scale Invariant Key Points', *International Journal of Computer Vision*, Volume 60, No. 2, pages 91 to 110, 2004. The SIFT algorithm is also implemented by the OpenCV library, referenced above.

The SIFT algorithm is known to extract a large number of high-dimensional features from an image, with the consequence that the cost of running a search algorithm may be unacceptably high. A feature reduction process 704 is therefore employed in an embodiment of the invention to provide feature filtering and sketch embedding, in order to overcome this problem.

A Locality Sensitive Hashing (LSH) method in combination with a k nearest neighbor (K-NN) is employed to provide efficient approximate searching. In particular, LSH is employed for offline K-NN graph construction, by building an LSH index and then running a K-NN query for each object. In this case, the index 806 and query resolution data structure together comprise the LSH index tables and the K-NN graph.

In order to further reduce the number of features (each of which comprises a 128 element vector in an embodiment of the invention) further filtering is performed in the feature reduction process 804. For example, a feature that is repeated in many images within the reference image database 202 is a not a useful discriminating feature, and can be ignored in the search algorithm. By analogy with non-discriminating words, such as 'the' and 'and', within a text corpus, a Term Frequency-Inverse Document Frequency (TF-IDF) algorithm has been used to filter for the most useful features, and to reduce noise in the data set.

Further details of the K-NN graph construction, and LSH indexing, can be found in Dong, W, et al, 'Efficient k Nearest Neighbor Graph Construction for Generic Similarity Measures', *WWW* 2011, Mar. 28 to Apr. 1, 2011, Hyderabad, India.

A search within the index/graph 806 results in a list of ranked similar images 808 from which a selection 810 is made. The description associated with the corresponding image within the reference image database 202 is returned 812 as the result. Alternatively, if a closeness of match based on the ranking fails to meet a predetermined threshold, the match may be rejected and an alternative recognition process employed.

According to an embodiment of the invention, the general image search and indexing algorithms, as illustrated by the flow diagram 800, are also used to manage and search the history database, which has been described with reference to items 316 to 320 in FIG. 3.

Figure 9:
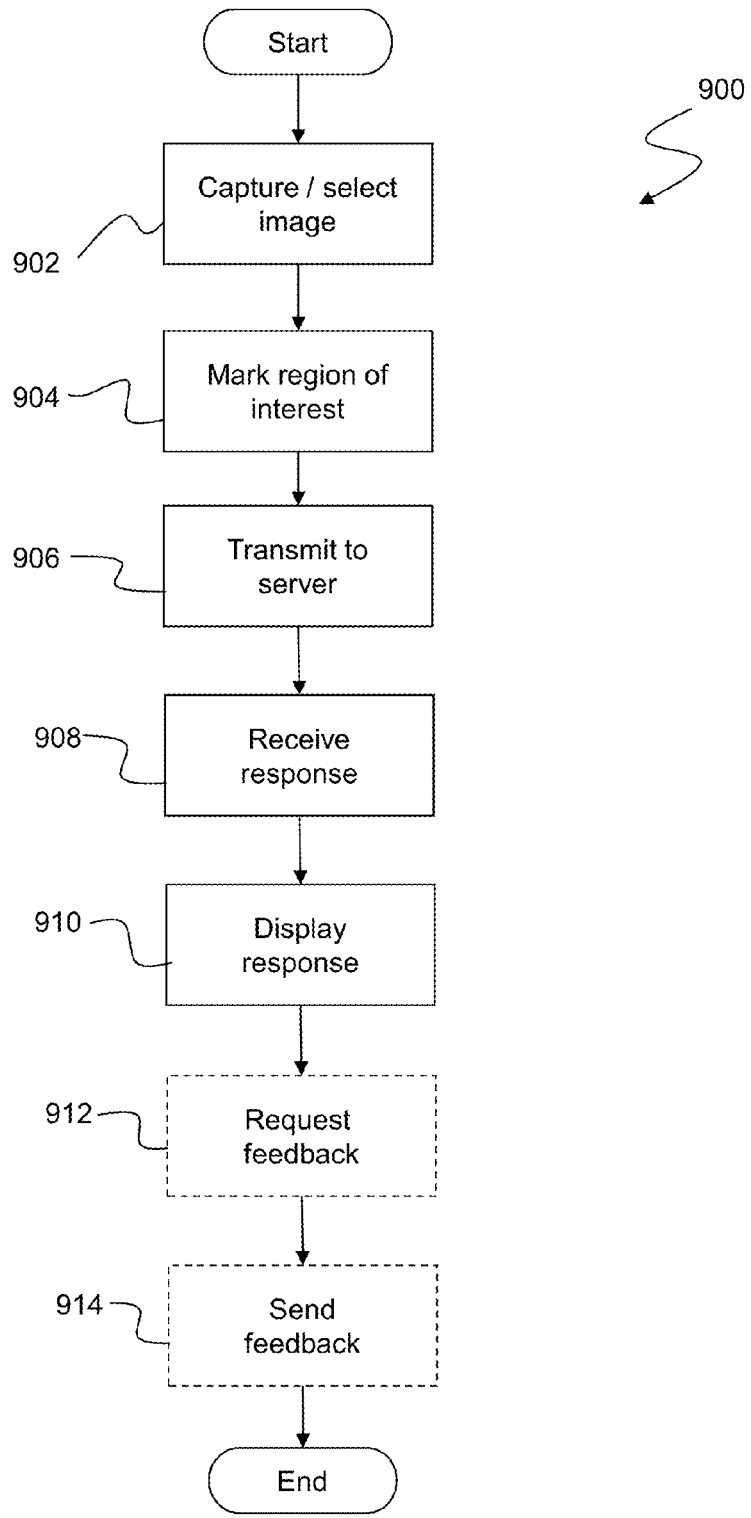
FIG. 9 is a flowchart of a client-based object recognition process embodying the invention.

FIG. 9 is a flowchart of a client-based object recognition process embodying the invention. In particular, the process 900 may be executed by an application running on a user device, such as a smart phone, a tablet, a notebook PC, a desktop PC, and so forth. Additionally, the process 900 may be employed in a web-based implementation, whereby the client is a conventional web browser, and the process may be implemented using a combination of client and server-side code.

At step 902, the user captures or selects an image. For example, a smart phone may be used to photograph an object for which identification is required. Alternatively, an image may be selected from a web page, or from a collection of one or more stored images on the user's device.

At step 904, the user may be facilitated to select a specific region of the image within which the object appears. This step may be useful, for example, where the user has photographed an object, and the resulting photograph includes a number of other objects or features, such as a cluttered background. By enabling the user to mark a specific region containing the object, the object recognition algorithms can focus on the marked region, and ignore (or crop) the extraneous features.

At step 906, the image, along with any metadata (such as an indication of a specific region of interest) is transmitted to the object recognition server 104. The object recognition server 104 processes the image in an effort to identify an object contained therein, as has been described above with reference to FIGS. 2 to 8. A result (being a description of the object) is thus generated and transmitted, to be received 908 by the client device/software. The result is then displayed 910 to the user. The user may also be enabled to obtain further information about the identified object, such as additional descriptive information and/or purchasing information. For example, upon the user selecting a 'more information' option, the application executing on the user device may conduct a search of available information resources (such as search engines, catalogs, online encyclopedias, or similar) using the description of the object, in order to obtain and display additional descriptive information. Alternatively, or additionally, upon the user selecting a 'purchase' option, the application executing on the user device may conduct a search of online commerce sites using the description of the object and/or may query a database of geographical information in order to identify a physical store in the vicinity of the user, in order to obtain and display purchasing information.

At step 912, the user may optionally be provided with an opportunity to provide feedback on the quality, usefulness and/or accuracy of the returned description. Any feedback provided is transmitted to the object recognition server 104 at step 914. These feedback steps (if available) correspond with steps 332 and 334 in the flowchart 300 of FIG. 3.

In summary, embodiments of the invention provide a powerful and efficient object recognition service that is able to bring together a number of different algorithms for object recognition in a manner that exploits the best features of each, and flexibly enables new and/or additional algorithms to be incorporated, updated, or improved as new developments are made in the fields of computer vision, image processing and object recognition. Embodiments of the invention are able to take advantage of specific, efficient, and highly reliable techniques, such as barcode and QR code detection and decoding, but also to fall back upon a succession of alternative analysis, detection and searching methods, such as text extraction, fast feature extraction, more accurate (but more resource intensive) feature extraction, along with general techniques such as image searching, crowd sourcing, and the use of third-party services, in order to provide a good trade-off between speed and accuracy, as well as enabling the system to 'learn' from its experience of search images.

While particular embodiments have been described, by way of example only, a person skilled in the relevant arts will appreciate that a number of variations are possible, within the scope of the present invention. Accordingly, the exemplary embodiments should not be regarded as limiting, but rather the invention is as defined in the claims appended hereto.

We claim:

1. An object identification method comprising:
   providing one or more databases which contain:
      a corpus of reference images, each reference image comprising an identifiable reference object and being associated in the database with a corresponding text description of the reference object; and
      a plurality of image query resolution data structures, each comprising a collection of records wherein each record includes an image descriptor of one of the reference images, and wherein each data structure is searchable using a corresponding one of a set of predetermined search algorithms to identify a closest match record within the data structure based upon the image descriptors,
   populating the corpus of reference images, at least in part, by one or more crawler processes, each configured to traverse a corresponding selected subset of the internet, to identify and extract reference images comprising reference objects, and to analyze image-associated content to determine the corresponding text description of the reference object comprised within each extracted reference image;
   updating the image query resolution data structures to incorporate records for the extracted reference images;
   receiving a query comprising an input image which includes a query object; for each of one or more applicable search algorithms selected from the set of predetermined search algorithms, generating a query image descriptor of the input image and searching the corresponding image query resolution data structure to identify a closest match record corresponding with the query image descriptor;
   selecting a best available match record from the closest match records identified in the image query resolution data structures;
   retrieving the text description associated with the reference image corresponding with the best available match record; and
   providing, as an output object identification, the retrieved text description.

2. The method of claim 1 wherein the set of predetermined search algorithms includes one or more algorithms selected from the group comprising: a barcode detection algorithm, a QR code detection algorithm; a text detection algorithm; a movie poster detection algorithm; a product detection algorithm; and a general image detection algorithm.

3. The method of claim 1 wherein generating a query image descriptor comprises one or more of:
   extracting barcode features from the input image;
   extracting QR code features from the input image;
   extracting text features from the image;
   extracting Speeded Up Robust Features (SURF) feature vectors from the input image; and
   extracting Scale Invariant Features Transform (SIFT) feature vectors from the input image.

4. The method of claim 1 wherein the one or more crawler processes comprise a plurality of content-specific crawler processes, each of which is configured to extract content-specific images and to determine associated descriptive text.

5. The method of claim 4 wherein the content-specific crawler processes are configured to crawl web sites selected from:
   online movie databases;
   online stores;
   online encyclopedias; and
   specific-interest-related web sites.

6. The method of claim 1 wherein the corpus of reference images is further populated, at least in part, using results from image search queries.

7. The method of claim 1 wherein the image query resolution data structures comprise one or more of:
   a barcode index data structure;
   a QR code index data structure;
   a text index data structure;
   a k-dimensional tree structure of feature vectors; and
   a n-Nearest Neighbor graph structure of feature vectors.

8. The method of claim 1 further comprising searching a history database containing previously received input images and associated text descriptions.

9. The method of claim 1 further comprising comparing a quality measure of the best available match against a predetermined threshold requirement and, in the event that the quality measure fails to meet the threshold requirement, obtaining a third-party text description of the image by performing one or more further steps selected from the group comprising:
   performing a reverse image search of the input image using a remote image search engine to obtain a text description corresponding with the image;

submitting the input image to a remote online crowdsourcing service along with a request for a text description of the query object to obtain a text description corresponding with the image; and submitting the input image to a remote third-party automated image identification service to obtain a text description corresponding with the image.

10. The method of claim 8 further comprising a step of storing the input image in association with the third-party text description in the history database, which may be searched for an improved match to a subsequently-received input image, relative to the best available match.

11. The method of claim 1, further comprising:

receiving user feedback in relation to accuracy of the retrieved text description; and storing the user feedback for subsequent review by an operator.

12. The method of claim 11 further comprising:

receiving an instruction from the operator to update the corpus of reference images based upon the user feedback; and updating the corpus of reference images.

13. An object identification server comprising:

at least one processor;

at least one non-volatile storage device comprising one or more databases which contain:

a corpus of reference images, each reference image comprising an identifiable reference object and being associated in the database with a corresponding text description of the reference object; and a plurality of image query resolution data structures, each comprising a collection of records wherein each record includes an image descriptor of one of the reference images, and wherein each data structure is searchable using a corresponding one of a set of predetermined search algorithms to identify a closest match record within the data structure based upon the image descriptors, at least one computer-readable memory device operatively associated with the processor; and a network communications interface operatively associated with the processor, wherein the memory device contains computer-executable instruction code which, when executed via the processor, causes the processor to effect a method comprising steps of:

populating the corpus of reference images, at least in part, by one or more crawler processes, each configured to traverse a corresponding selected subset of the internet, to identify and extract reference images comprising reference objects, and to analyze image-associated content to determine the corresponding text description of the reference object comprised within each extracted reference images;

updating the image query resolution data structures to incorporate records for the extracted reference images;

receiving a query comprising an input image which includes a query object;

for each of one or more applicable search algorithms selected from the set of predetermined search algorithms, generating a query image descriptor of the input image and searching the corresponding image query resolution data structure to identify a closest match record corresponding with the query image descriptor;

selecting a best available match record from the closest match records identified in the image query resolution data structures;

retrieving the text description associated with the reference image corresponding with the best available match record; and providing, as an output object identification, the retrieved text description.

14. A non-transitory computer-readable medium comprising executable program instructions which, when executed by a corresponding processor, cause the processor to implement a method comprising steps of:

acquiring an image which includes a query object;

generating and transmitting, to an object identification server according to claim 13, a query comprising the image;

receiving, from the object identification server, an object identification comprising a text description of the query object; and displaying, to a user, the text description of the query object.

15. The non-transitory computer-readable medium of claim 14 comprising further executable program instructions which, when executed by the processor, cause the processor to implement the method comprising a further step of:

enabling the user to select a region of the image containing the query object prior to generating and transmitting the query.

16. The non-transitory computer-readable medium of claim 14 comprising further executable program instructions which, when executed by the processor, cause the processor to implement the method comprising a further step of:

after displaying the text description of the query object, enabling the user to obtain further information about the query object.

17. The non-transitory computer-readable medium of claim 16 wherein the further information comprises one or more of:

additional descriptive information of the query object; and purchasing information in relation to the query object, wherein the further information is obtained from one or more available information resources using a search query based upon the text description of the query object.

18. The method of claim 1 wherein the subset of the internet traversed by one or more of the crawler processes is selected based upon subject matter of associated content.

19. The method of claim 18 wherein the subject matter of associated content is selected from a group comprising: cars; shoes; jewelry; animals; plants; toys; and clothing.

20. The method of claim 1 wherein the subset of the internet traversed by one or more of the crawler processes is selected based upon syntactic or semantic structure of associated content.

21. The method of claim 20 wherein the subset of the internet traversed by one or more of the crawler processes based upon syntactic or semantic structure of associated content is selected from the group comprising: movie databases; online stores; and online encyclopedias.

* * * * *